US007314096B2

(12) United States Patent
Shaffer et al.

(10) Patent No.: US 7,314,096 B2
(45) Date of Patent: Jan. 1, 2008

(54) ADJUSTABLE HANDLE FOR PORTABLE TOOL

(75) Inventors: Chadwick A. Shaffer, Oakdale, MN (US); John O. Hurst, Savage, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/975,682

(22) Filed: Oct. 27, 2004

(65) Prior Publication Data

US 2006/0096135 A1 May 11, 2006

(51) Int. Cl.
*A01B 1/00* (2006.01)

(52) U.S. Cl. .......................... 172/372; 172/41; 172/13; 16/110.1

(58) Field of Classification Search .................. 172/41, 172/25, 13, 14, 371, 372; 16/110.1, 111.1; 7/114; 30/500
See application file for complete search history.

(56) References Cited

U.S. PATENT DOCUMENTS 3,221,481 A 12/1965 Mattson et al.
3,330,102 A 7/1967 Schuman, Jr.
3,341,234 A 9/1967 Mattson et al.
3,350,864 A 11/1967 Sheps et al.
3,561,199 A 2/1971 Lay
3,627,054 A 12/1971 Lay
4,043,101 A * 8/1977 Lahr et al. .................. 56/17.1
4,190,972 A 3/1980 Berner
4,255,880 A 3/1981 McMickle et al.
4,295,285 A 10/1981 Stevens
4,329,792 A 5/1982 Berner
4,378,644 A 4/1983 Tuggle et al.
4,505,040 A 3/1985 Everts
4,894,914 A 1/1990 Mead
5,161,318 A 11/1992 Bergman et al.
5,269,082 A 12/1993 Sund et al.
5,398,431 A 3/1995 Beihoffer et al.
5,522,162 A 6/1996 Allison
5,553,406 A 9/1996 Cerny
5,560,108 A 10/1996 Wilson
5,594,990 A * 1/1997 Brant et al. .................. 30/122
5,603,173 A 2/1997 Brazell
D380,129 S 6/1997 Meisner et al.
D382,450 S 8/1997 Meisner et al.
D382,778 S 8/1997 Meisner et al.
5,662,428 A 9/1997 Wilson
5,771,582 A 6/1998 Tuggle
5,809,653 A * 9/1998 Everts et al. ................ 30/122

(Continued)

*Primary Examiner*—Thomas A Beach
(74) *Attorney, Agent, or Firm*—Fulbright & Jaworski L.L.P.

(57) ABSTRACT

A handle having an adjustable shaft wherein the overall length of the shaft and/or the angular relationship of portions of the shaft can be varied by a user of an associated tool. In one embodiment, the handle includes a first tube, a second tube connected to a working unit of a portable tool, and wherein a portion of the second tube is telescopically received into the first tube. A coupling is provided to receive a portion of the first tube and the second tube. The coupling has a pin stop which engages a pin connected to one of the tubes and defines a limit of a range of relative rotational motion between the first tube and the second tube. In one embodiment, the upper tubular portion of the handle and a control grip are capable of being rotated relative to a working unit.

27 Claims, 9 Drawing Sheets

U.S. PATENT DOCUMENTS

| | | | |
|---|---|---|---|
| 5,867,911 A | 2/1999 | Yates et al. | |
| D406,225 S | 3/1999 | Searle et al. | |
| 5,933,966 A | 8/1999 | Yates et al. | |
| 6,076,265 A | 6/2000 | Huang Lo | |
| 6,182,383 B1 | 2/2001 | Reed, Jr. | |
| D440,131 S | 4/2001 | Aglassinger et al. | |
| 6,260,278 B1 * | 7/2001 | Faher | 30/276 |
| 6,301,866 B1 | 10/2001 | Marshall et al. | |
| D450,226 S | 11/2001 | Martin | |
| 6,327,781 B1 | 12/2001 | Sinclair et al. | |
| D457,403 S | 5/2002 | Cooper | |
| 6,386,575 B1 * | 5/2002 | Turner | 280/647 |
| 6,439,088 B1 | 8/2002 | Eytchison et al. | |
| 6,460,319 B2 * | 10/2002 | Marshall et al. | 56/233 |
| 6,516,598 B1 | 2/2003 | Notaras et al. | |
| D473,114 S | 4/2003 | Acuña et al. | |
| D473,115 S | 4/2003 | Van Wambeke et al. | |
| 6,581,246 B1 | 6/2003 | Polette | |
| D479,676 S | 9/2003 | Vam Wambeke et al. | |
| D479,677 S | 9/2003 | Vam Wambeke et al. | |
| D479,962 S | 9/2003 | Vam Wambeke et al. | |
| 6,643,958 B1 | 11/2003 | Krejci | |
| 6,643,959 B2 | 11/2003 | Jolliff et al. | |
| D483,236 S | 12/2003 | Martin et al. | |
| 7,134,208 B2 * | 11/2006 | Wilkinson et al. | 30/276 |

* cited by examiner

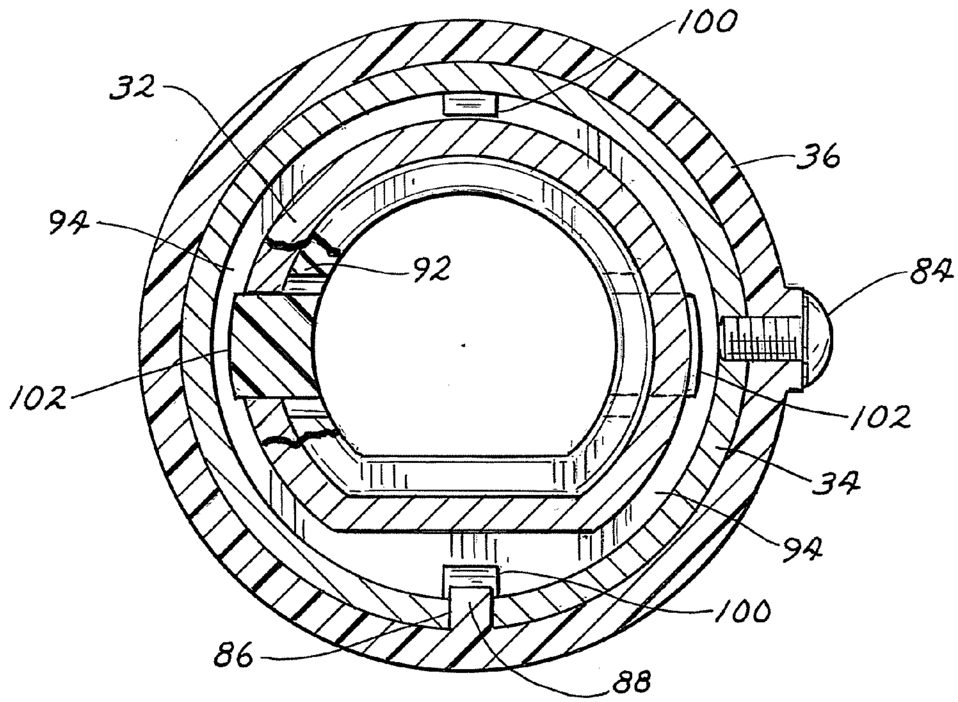
FIG. 7
FIG. 6
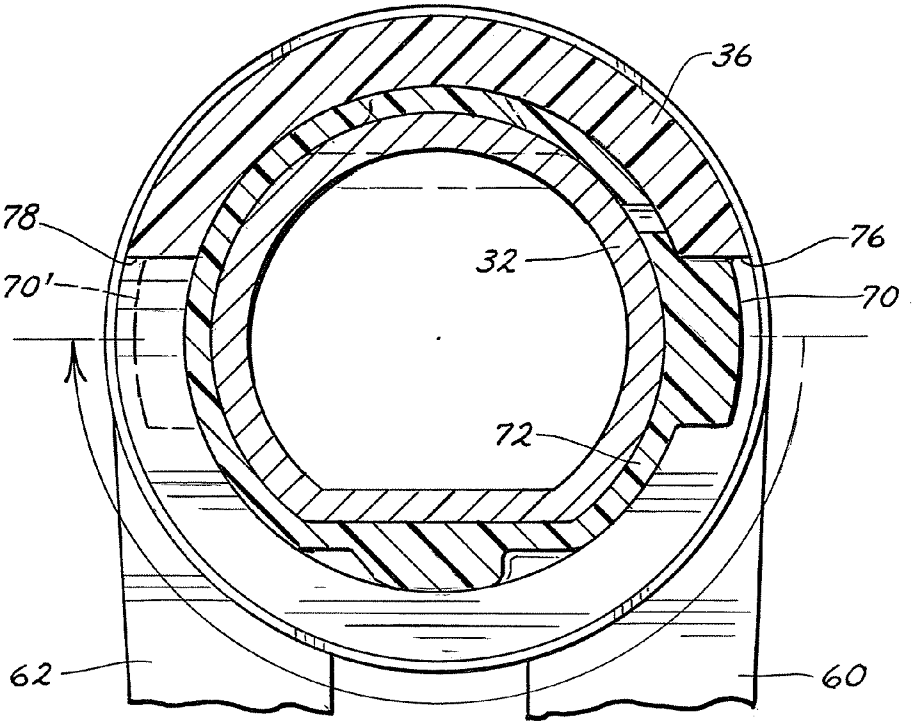

ADJUSTABLE HANDLE FOR PORTABLE TOOL

TECHNICAL FIELD

This invention relates in general to a handle for a hand-held tool. More particularly, this invention relates to an adjustable handle for a hand-held portable tool.

DESCRIPTION OF THE PRIOR ART

Yard tools having a powered work tool at one end of a handle shaft are well known. For example, hand-held snow throwers have been developed and used in place of manual snow shoveling. These devices usually include a housing having some type of snow impelling mechanism, e.g. a rotatable rotor. These snowthrowers are configured to act much like a shovel and, in fact, is manipulated by the user in a manner similar to a shovel. The snowthrowers have a small housing at one end of an elongated handle that extends upwardly from the housing. The housing includes a relatively open reel-type impeller and a small electric motor for rotating the impeller. As the impeller rotates, the blades of the impeller contact and move the snow through the housing. One such electric snowthrower is disclosed in U.S. Pat. No. 4,295,285 to Stevens, entitled Snowthrower, and incorporated by reference herein.

Various types of rotary sweeping machines have also been developed. One type of device provides a hand-held portable rotary sweeping tool having an elongate boom and having a power generation means disposed at one end thereof and a power sweeping means disposed at the other end. Such an rotary sweeping device is disclosed in U.S. Pat. No. 5,269,082 to Sund et al.

Portable rotary cutting tools, such as string trimmers, have long been used to cut vegetation, particularly in areas inaccessible by a lawn mower or other cutting device. Such portable rotary cutting tools include a small internal combustion engine or electric motor operatively connected to a cutting element. Such tools typically are provided with shaft and handle serving the purpose of supporting the tool with both hands and providing for control of the rotary cutting element. A shaped hand portion is often provided at the end opposite the work tool which the user grasps with one handle when maneuvering the work tool over the area being worked. When the work tool is at the end of a relatively long shaft, the user has to apply considerable muscular effort to maintain the tool in position. The arm muscles of the user can therefore begin to ache after operating the tool over a period of time. To alleviate this problem, it is known to provide the handle shaft of such a tool with a second handle which the user may then grasp with his other hand. Such two handed operation is generally less tiring.

Given the different types of work tools and the anthropometric differences between users, it would be desirable to provide an adjustable handle to accommodate a variety of different work tools and user. A need exists for an adjustable handle and shaft assembly for a hand-held tool having a powered work tool at one end of a handle shaft.

SUMMARY OF THE INVENTION

The present invention relates to adjustable handles. More particularly, this invention relates to handle having an adjustable shaft wherein the overall length of the shaft can be varied by a user of an associated tool. In one embodiment, the handle includes a first tube, a second tube connected to a working unit of a portable tool, and wherein a portion of the second tube is telescopically received into the first tube. A coupling is provided to receive a portion of the first tube and the second tube. The coupling having a pin stop which engages a pin connected to one of the tubes and defines a limit of a range of relative rotational motion between the first tube and the second tube.

Another aspect of the present invention is the provision of an adjustable handle having portions that rotate relative to each other to facilitate different orientations of tool use. In one embodiment, the upper tubular portion of the handle and a control grip are capable of being rotated relative to a working unit.

One embodiment of the present invention provides a portable yard tool having a working unit with a control grip connected to the working unit and adapted to be grasped by a user. A pair of tubes connect the working unit and the control grip and one of the pair of tubes is telescopically received into the other tube. A tube coupling has a pair of pin stops which engage a pin connected to one of the pair of tubes and define the range of relative rotational motion between the pair of tubes.

Yet another aspect of the present invention is the provision of a handle having two handle tubes which may be rotated relative to each other so that the orientation of the handle and a control grip can be rotated relative to a working unit housing. Preferably, the two handle tubes may be rotated approximately 180 degrees relative to each other. As a result, the control grip of the yard tool is provided in generally the same orientation to the user in different modes of operation. In one embodiment, the control grip is maintained in a similar orientation to the user even though the working unit of device has assumed substantially different orientations and performs substantially different operations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

This invention will be described in more detail in the following Detailed Description, when taken in conjunction with the following drawings, in which like reference numerals refer to like elements throughout.

FIG. 6 is a cross-sectional view of the assembly of FIG. 4 taken along lines 6-6 in FIG. 4;

FIG. 7 is a cross-sectional view of the assembly of FIG. 4 taken along lines 7-7 in FIG. 4;

DETAILED DESCRIPTION

Figure 1A:
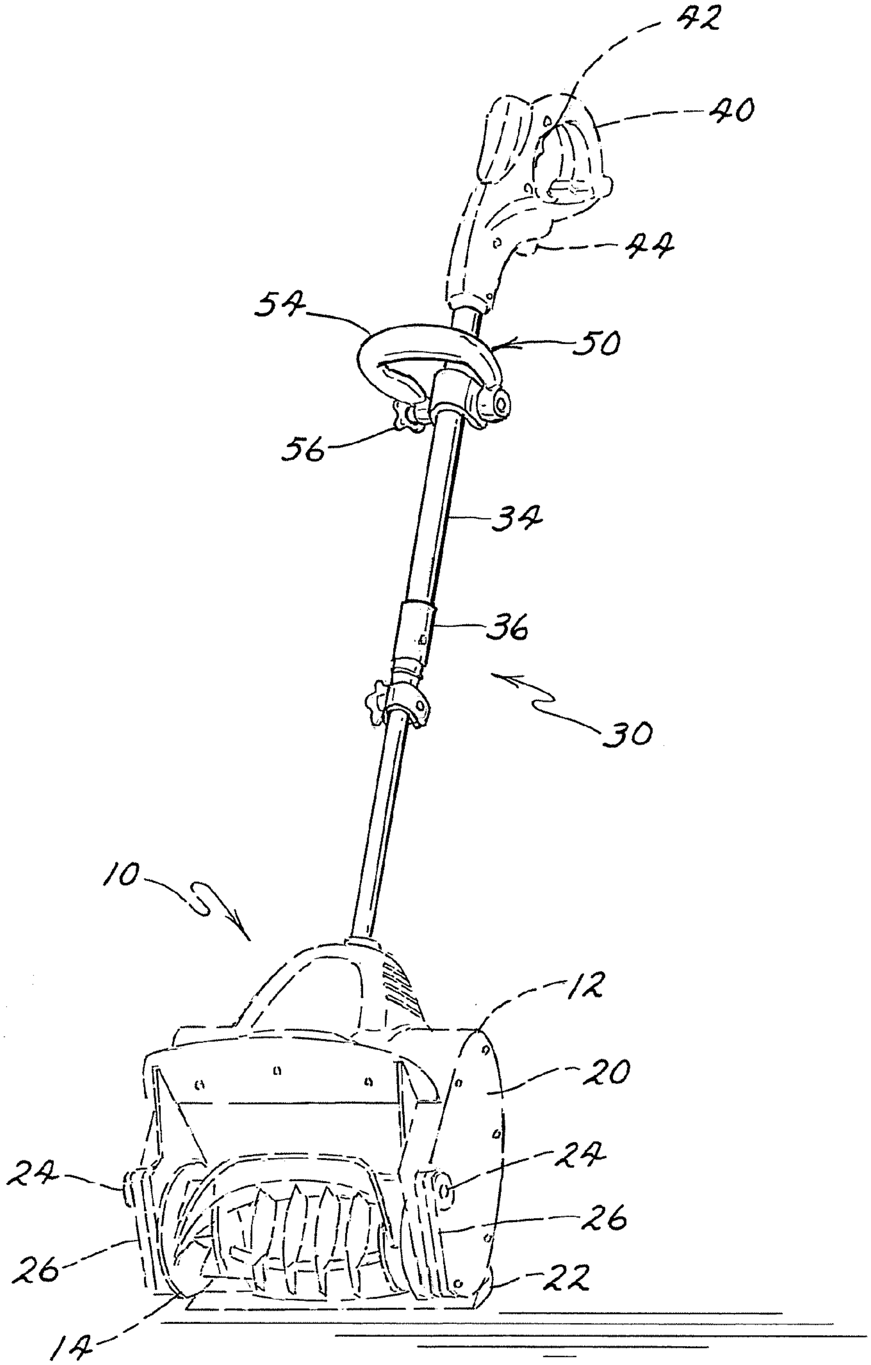
FIG. 1*a* is a perspective view of a portable hand-held yard tool incorporating aspect of the present invention.
Figure 1B:
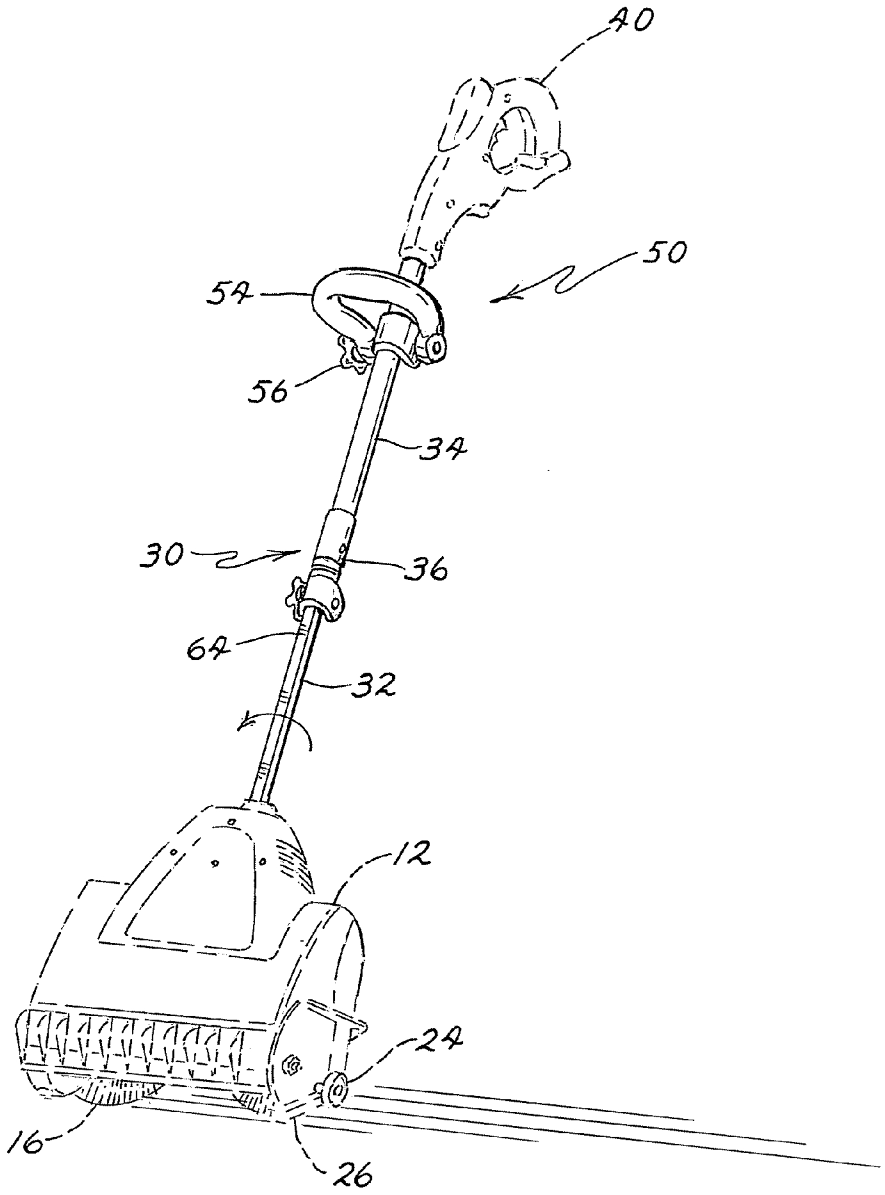
FIG. 1*b* is a perspective view of a portable hand-held yard tool of FIG. 1 having the working unit oriented for a different operational mode.

Referring to FIGS. 1*a* and 1*b*, a yard tool incorporating aspects of the present invention is generally illustrated as 10. Yard tool 10 includes a housing 12 within which a rotatable implement is positioned. Different rotatable implements may be contained within housing 12 including, for example, a snow-engaging impeller 14 of FIG. 1*a* and a generally cylindrical broom 16 of FIG. 1*b*. Implements 14, 16 are interchangeable and are selectively mounted for rotation inside housing 12 depending on the intended use of the yard tool 10. Two modes of operation of the yard tool 10 include a snow throwing mode and a debris sweeping mode. Other portable hand-held tools including, but not limited, to string trimmers, lawn edgers and powered brooms could utilize a handle assembly according to the present invention.

Figure 3:
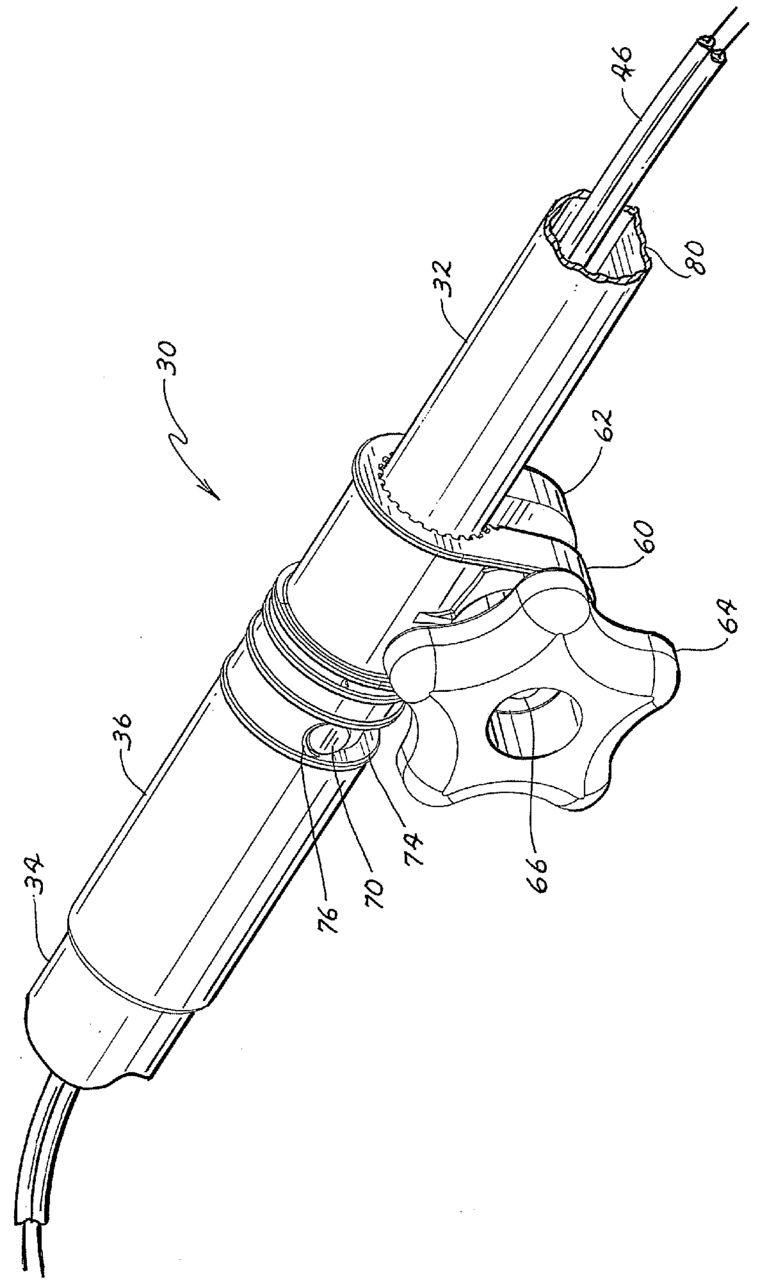
FIG. 3 is a detailed view of a tube coupling of the embodiment of FIGS. 1*a* and 1*b;*

An electric drive motor 20 is positioned within housing 12 for powering the rotating implement 14, 16. Tool 10 can be supported upon surfaces by a scraper bar 22, by wheels 24, and/or by skids 26. An elongated handle 30 extends upwardly from the top of housing 12. Handle 30 includes a lower tube 32, an upper tube 34, and a coupling 36 which connects the upper and lower tubes 34, 32 together and limits the relative axial movement of the tubes and the relative rotation between tubes via a clamping mechanism as described in more detail hereinafter. A control grip 40, located at the upper end of handle 30 provides a means which the user can hold and control tool 10. In addition, control grip 40 includes a switch 42 for controlling the actuation of electric drive motor 20 and a power plug 44 adapted to be connected to an extension cord. An additional interlock or safety button (not shown) on control grip 16 may need to be depressed prior to or concurrently with switch 34 being depressed in order to operate tool 10. A conductor 46 extends down through handle 10 to motor 20. A portion of conductor 46 is illustrated in FIG. 3. An accessory assist handle 50 is located between the upper end of the handle 30 and the housing 12 and provides additional user support and control of yard tool 10. As further described herein, portions of handle 30 are capable of being rotated relative to the housing 12 to accommodate different modes of operation. Additionally, assist handle 50 is adapted to be positioned along upper tube 34 and may be rotated about upper tube 34. As further described herein, a bail portion 54 of the assist handle 50 is movable so that the relative angular orientation between bail 54 and the handle tube 34 may be adjusted.

The yard tool 10 of FIGS. 1*a* and 1*b*, can be used to perform two different operations, including a snow throwing operation and a sweeping operation. A transition between the operations includes an exchange of the two different implements 14, 16, e.g., the snow impeller 14 is removed and replaced with the broom 16. Additionally, the housing 12 of the tool is reoriented relative to the ground surface so that tool 10 is supported by wheels 24 and/or skids 26, instead of tool 10 being supported by a scraper bar 22. As described in greater detail herein, the upper portion of handle 30, accessory assist grip 50, and control grip 40 are rotated approximately 180 degrees relative to the housing 12 during the transition between the two different operations. Additionally, the overall length of the handle 30 can be adjusted to accommodate user preferences, such as for a shorter handle during a snow throwing operation. Additional aspects of yard tool 10 are disclosed in U.S. Ser. No. 10/975,683, entitled "Convertible Yard Tool," filed on Oct. 27, 2004, and being incorporated by reference herein.

The two handle tubes 32, 34 may be rotated relative to each other so that the orientation of the handle 30 and control grip 40 can be rotated relative to housing 12. Preferably, the two handle tubes 32, 34 may be rotated approximately 180 degrees relative to each other. As a result, and as illustrated in FIGS. 1*a* and 1*b*, the control grip 40 of the yard tool 10 is provided in generally the same orientation to the user in different modes of operation. In the illustrated embodiment, control grip 40 maintains its general orientation to the user even though the working unit of device 10 has assumes substantially different orientations and performs substantially different operations.

Figure 2:
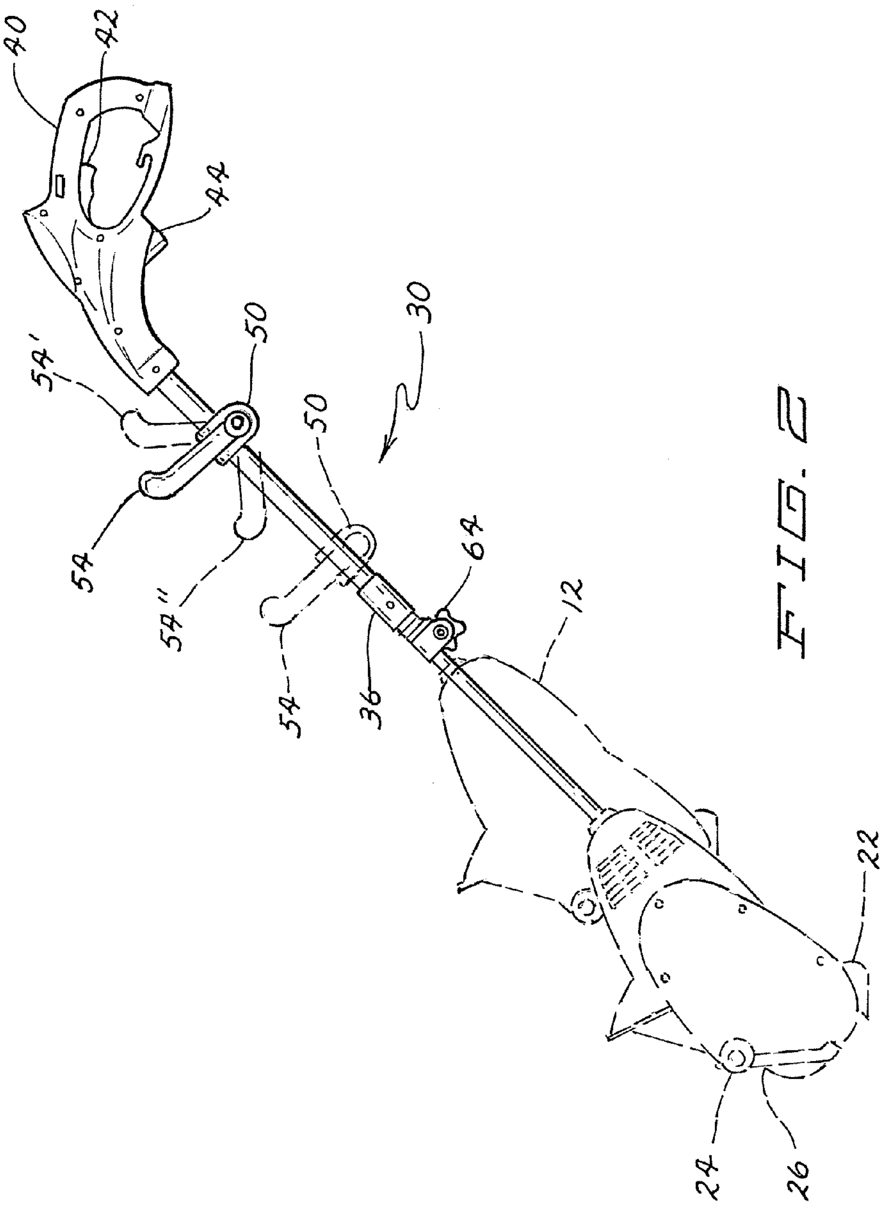
FIG. 2 is a side elevational view depicting ranges of motion of the handle assembly of the tool in FIGS. 1*a* and 1*b;*

As further illustrated in FIG. 2, assist handle 50 is movably secured to upper handle tube 34 by handle clamp 56. Assist handle 50 can be adjusted and secured in different positions along the upper handle tube 34. For example, assist handle 50' depicts movement of assist handle 50 to a different position along tube 34. Additionally, the angle between bail 54 of assist handle 50 and upper handle tube 32 can be adjusted, for example, to accommodate different uses. As an example, bail 54' and bail 54" depict different orientations of bail 54. FIG. 2 also illustrates that the overall length of handle 30 can be varied so that the distance between housing 12 and control handle 40 can be varied by an operator.

FIG. 3 is a detailed view of a coupling 36 according to one embodiment of the invention and portions of the upper tube 34 and lower tube 32. Preferably, the handle 30 includes a lower handle tube 32 and an upper handle tube 34 connected in a telescopic manner, i.e., upper tube 34 is capable of receiving lower tube 32 such that tubes 32, 34 interfit together in a generally coaxial and telescoping arrangement. Coupling 36 is provided to temporarily fix the relative positions of the tubes 32, 34. In the illustrated embodiment, coupling 36 surrounds portions of tubes 32, 34. Coupling 36 preferably includes a clamp assembly having flexible clamp halves 60, 62, a knob 64 and associated fastener 66 to compress the clamp halves 60, 62 together to temporarily secure handle tubes 32 and 34 together.

As illustrated in FIG. 3, a lower end portion of upper tube 34 is received into the upper end of coupling 36. Lower tube 32 is telescopically received into the upper tube 34 through coupling 36. A pin member 70 is connected to lower tube 32 and rotates with the lower tube 32 as the lower tube 32 is rotated about its longitudinal axis. As described in more detail hereinafter, pin member 70 is provided on a collar 72 which can freely slide along lower tube 32 during an adjustment operation, but which rotates with lower tube 32 so that as the lower tube 32 is rotated about its longitudinal axis collar 72 and pin 70 is also rotated. As described in more detail herein, pin 70 rotates within a semicircular slot 74 in coupling 36 and engages a pair of pin stops 76, 78 defined at the ends of slot 74.

Examination of a cross section of the lower tube 32 of the illustrated embodiment of the present invention reveals that lower tube 32 is not entirely circular. Instead, lower tube 32 includes a generally planar surface 80 extending in the longitudinal direction of lower tube 32. As described in more detail with reference to FIGS. 6 and 7, planar surface 80 engages a corresponding planar surface within collar 72 so that lower tube 32 and collar 72 rotate together about the longitudinal axis of lower tube 32.

Figure 4:
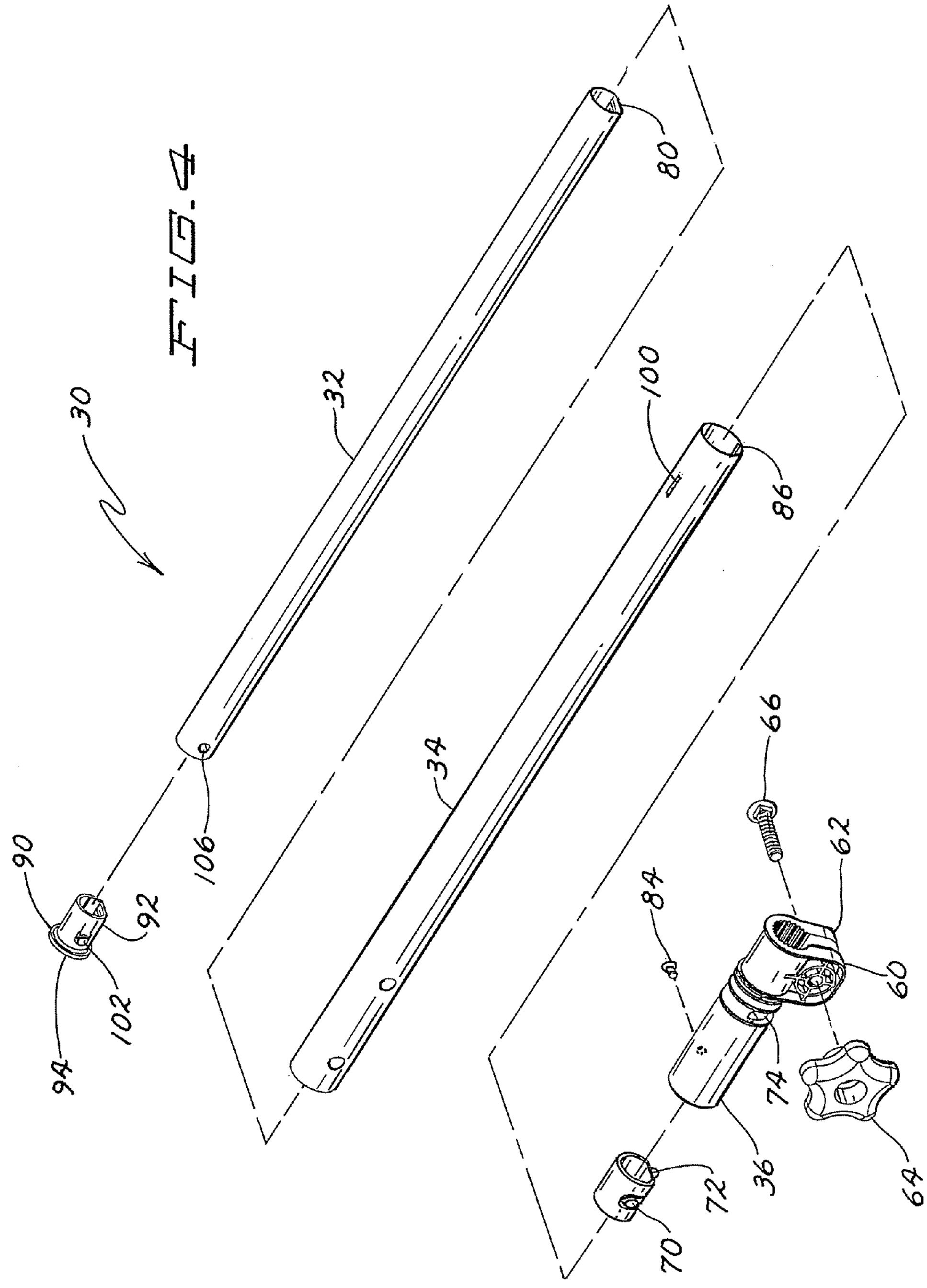
FIG. 4 is an exploded view of components of a handle assembly of the embodiment of FIGS. 1*a* and 1*b;*

The assembly of shaft 30 can be described with reference to FIGS. 4 and 5. FIG. 4 is an exploded view of components of one embodiment of the shaft 30. As an initial step, collar 72 is inserted into coupling 36. Collar 72 includes pin member 70 that resiliently deflects into the collar interior as collar 70 is inserted into the upper opening of coupling 36. Collar 72 is passed through the upper portion of coupling 36 until it reaches a stop defined as a shoulder 82 proximate to the clamp halves 60, 62. When the collar 72 is so positioned and upon alignment with semi-circular slot 74, the pin member 70 expands to engage wall surfaces of semi-circular slot 74.

Coupling 36 is sized to receive a portion of the upper tube 34. Coupling 36 is secured to the upper tube 34 by a threaded fastener 84 which engages a corresponding threaded aperture on upper tube 34. The lower end of upper tube 34 includes a slot 86, which as illustrated in FIG. 5, engages an elongated internal boss 88 within coupling 36. Together the slot 86 and boss 88 cooperate to prevent coupling 36 from rotating relative to upper handle tube 34.

A tube cap 90 is secured at one end of the lower tube 32. A portion 92 of tube cap 90 is sized to be received into the lower tube 32. A flange portion 94 of the tube cap 90 is enlarged relative to portion 92. The flange portion 94 is sized to be received into the upper tube 34 so that lower tube 32 and tube cap 90 can be inserted into the upper tube 34. The flange portion 94 is adapted to engage a pair of stop tabs 100 of upper tube 34 to define a limit for the range of extension of lower tube 32. Tube cap 90 is preferably of a plastic material and includes a resilient connector having an cylindrical pin 102. When the tube cap 90 is inserted into the upper end of lower tub 32, the resilient connector deflects until the pin 102 is aligned with an aperture 106 of lower tube 32 at which point the resilient connector retracts to insert the pin 102 into aperture 106, effectively connecting the tube cap 90 to the lower tube 32.

Lower tube 32 can freely slide through upper tube 34 and collar 72 (in an unclamped configuration). As described in more detail herein, a clamp assembly can be used to secure the position of the lower tube 32 relative to the upper tube 34. FIG. 5 illustrates the lower tube 32 in its fully extended position relative to upper tube 34. Lower tube 32 is limited from further extension by engagement of flange portion 90 against stop tabs 100 of upper tube 34. FIG. 5 also illustrates movement of the lower tube 32 within upper tube 34. For example, tube flange 94' and tube cap pin 102' depict tube flange 94 and cap pin 102 in a different orientation as the lower tube 32 is further inserted into upper tube 34.

Figure 5:
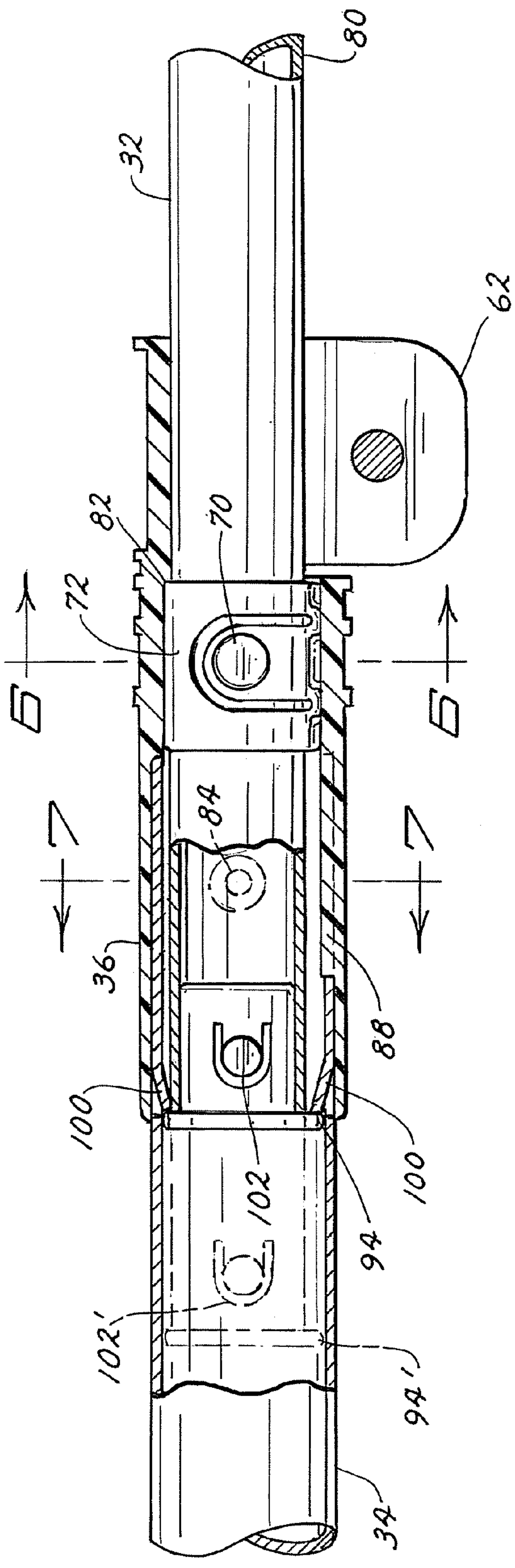
FIG. 5 is a partially broken-away view of a coupling and related components of the handle assembly of FIG. 4.

FIGS. 6 and 7 illustrate cross sections of the components of FIG. 5. FIG. 6 depicts the range of angular rotation between upper tube 34 and lower tube 32. For example, pin 70' depicts pin 70 in a different position adjacent opposite pin stop 78.

Figure 8:
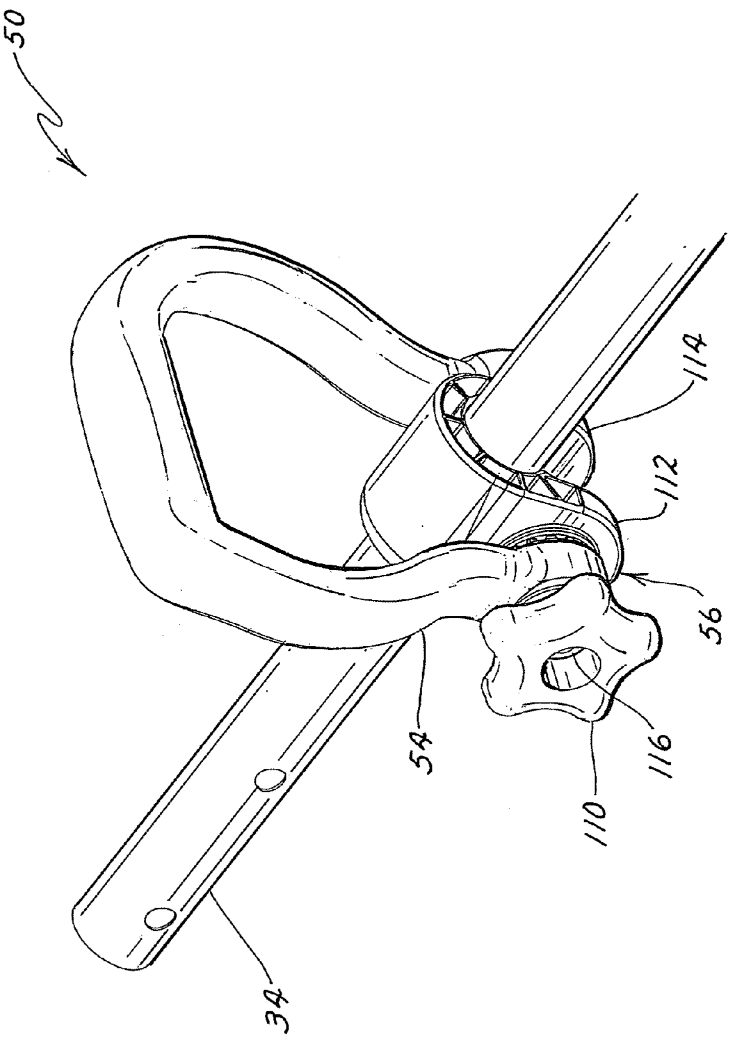
FIG. 8 is a perspective view of an embodiment of an accessory handle.
Figure 9:
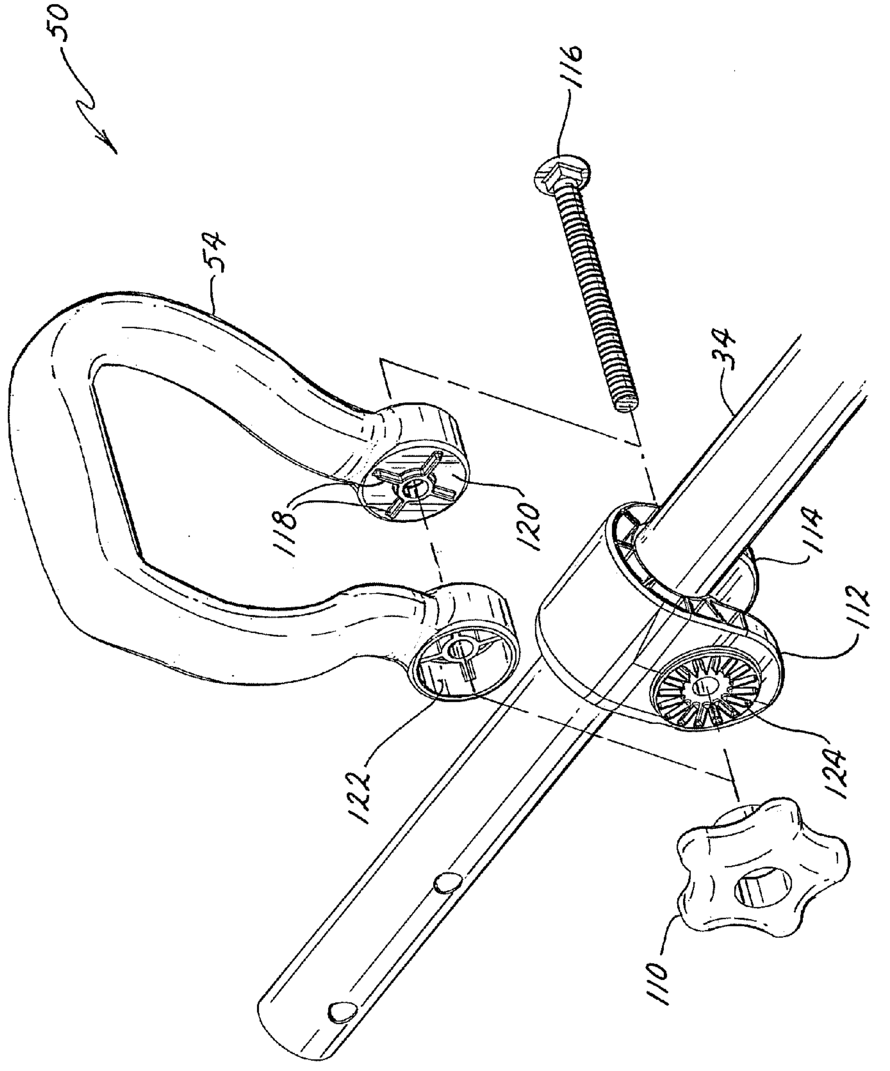
FIG. 9 is an exploded view of the accessory handle of FIG. 8

FIGS. 8-9 illustrate adjustable handle 50 and upper tube 32 of handle 30. Adjustable handle 50 includes bail element 54 and handle clamp 56. Handle clamp 56 includes a knob 110, clamp halves 112, 114 and fastener 116. Bail element 54 includes a plurality of radial teeth elements 118 extending from interior surfaces 120 of bail element 54. Bail element 54 includes a recess 122 adapted to receive a portion of knob 110. Clamp halves 112, 114 include a plurality of radial grooves 124 adapted to engage teeth elements 118 of bail element 54.

In operation of the device 10, the adjustable handle 50 can be positioned along the upper tube 32 to accommodate different uses and/or users. Upon sufficient loosening of knob 110, the force applied to tube 34 by handle clamp halves 112, 114 is decreased to permit the adjustable handle 50 to slide along upper tube 34. When knob 110 is sufficiently loosened, the teeth elements 118 are removed from engagement with grooves 124 and bail element 54 can be rotated about an axis of fastener 116. Tightening of knob 110 compresses the clamp halves 112, 114 and bail element 54 to secure the handle 50 in the desired orientation relative to handle tube 34.

In operation, the overall length of handle assembly 30 can be adjusted by loosening knob 64 of coupling 36 and extending or retracting the lower tube 32 relative to the upper tube 34. Upon tightening knob 64, the clamp halves 60, 62 of coupling 36 engage the lower tube 32 so as temporarily prevent further extension or retraction of the lower tube 32 relative to the upper tube 34. In this manner, a user can adjust the overall length of the handle assembly 30 to accommodate different users or different modes of operation. For example, FIG. 1*a* depicts a handle assembly 30 having a shorter overall length that may be useful when throwing snow in a snow removal mode of operation of the device 10, while FIG. 1*b* depicts a handle assembly 30 having a longer overall length that may be useful when sweeping debris in a sweeping mode of operation.

To convert the machine 10 between the snow throwing mode of operation of FIG. 1*a* and the debris sweeping mode of operation of FIG. 1*b*, the knob 64 of coupling 36 is sufficiently loosened so that the upper and lower tubes 32, 34 can be rotated relative to each other. The semi-circular slot 74 and received pin member 70 on collar 72 cooperate to limit the range of motion to approximately 180 degrees.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A tool comprising:

a working unit connected at one end of a tube, said working unit performing a pair of different ground surface operations depending at least in part on an orientation of the working unit relative to the ground surface;

a control grip connected at one end of another tube and adapted to be grasped by a user, wherein one of the tubes is telescopically received into the other tube, and a distance between said working unit and said control grip being substantially variable dependent on the extent that one of the tubes is received within the other tube; and a tube coupling having a pair of pin stops which engage a pin connected to one of the pair of tubes and define a range of relative rotational motion between the pair of tubes, wherein said tube coupling and said telescopically engaging tubes together permit both angular and axial adjustment between said working unit and said control grip, said tube coupling permitting the working unit to rotate approximately 180 degrees relative to the control grip as said working unit is reconfigured to perform a different one of said pair of ground surface operations.

2. The tool of claim 1 wherein the control grip includes an operator switch for control of the working unit.

3. The tool of claim 2 wherein the control grip further includes a receptacle for connection to an extension cord.

4. The tool of claim 1 further comprising:

a clamp for temporarily securing the pair of tubes together.

5. The tool of claim 4 wherein the clamp is part of the tube coupling.

6. The tool of claim 1 further comprising:

an assist handle adapted to be grasped by a user during operation of the tool, and a tube coupling is generally located at a tube end separate from said assist handle, and said assist handle defined by another clamp for securing the assist handle to the pair of tubes.

7. The tool of claim 6 wherein the assist handle is movably connected to the pair of tubes so that the position of the assist handle relative to the control grip can be adjusted.

8. The tool of claim 7 wherein the assist handle includes a bail element adapted to be adjusted into different angular orientations relative to the pair of tubes.

9. The tool of claim 1 wherein the pair of pin stops are defined as end portions of a slot of the tube coupling.

10. The tool of claim 1 wherein the pin is provide upon a collar which is slidably received onto one of the pair of tubes.

11. The tool of claim 10 wherein rotation of the collar relative to said one of the pair of tubes is substantially limited.

12. A tool comprising:

a working unit;

a control grip connected to the working unit and adapted to be grasped by a user;

a first tube connected at one end to said control grip;

a second tube connected at one end to the working unit, wherein at least a portion of said second tube being selectively telescopically received into the first tube so as to pennit operator adjustment of a distance between said control grip and said working unit to accommodate multiple different uses of said working unit; and a coupling at another end of the first tube and being located between said control grip and said working unit with a substantial portion of said second tube being telescopically received into said coupling and said first tube, said coupling having a pin stop which engages a pin connected to one of the tubes and defines a limit of a range of relative rotational motion between the first tube and the second tube, said coupling permitting selective rotation of the working unit relative to the control grip as the tool is reconfigured to perform a different ground surface operation.

13. The tool of claim 12 further comprising a clamp for temporarily securing the first tube to the second tube.

14. The tool of claim 13 wherein a control grip of the tool is connected at one end of the first tube.

15. The tool of claim 12 wherein the coupling is secured to the first tube.

16. The tool of claim 12 wherein the pin is defined upon a collar which is received upon the second tube.

17. The tool of claim 16 wherein the collar is capable of sliding along a length of the second tube.

18. The tool of claim 17 wherein the collar and the second tube are configured so that the collar rotates with the second tube as the second tube is rotated about its longitudinal axis.

19. The tool of claim 18 wherein the collar includes a generally planar portion and the second tube also includes a generally planar portion which engages the planar portion of the collar.

20. The tool of claim 19 wherein the generally planar portion extends along the second tube.

21. A tool comprising:

a working unit;

a control grip adapted to be grasped by a user;

a first tube and a second tube, said working unit being connected at an end of said first tube wherein at least a portion of said second tube being telescopically received into the first tube, said second tube being connected at one end to the control grip; and a coupling connected to another end of the first tube and slidably receiving portions of the second tube so as to substantially vary a distance between said working unit and said control grip to accommodate multiple different uses of said working unit, said coupling having a pair of pin stops which engage a pin connected to one of the tubes and define the range of relative rotational motion between the first tube and the second tube, said range of rotational motion allowing the working unit to assume substantially different orientations relative to the control grip as said tool is reconfigured to perform a different ground surface operation.

22. The tool of claim 21 further comprising a clamp for temporarily securing the first tube to the second tube.

23. The tool of claim 22 wherein a control grip of the tool is connected at one end of the first tube.

24. The tool of claim 23 wherein the pin is defined upon a collar which is received upon the second tube.

25. The tool of claim 24 wherein the collar is capable of sliding along a length of the second tube.

26. The tool of claim 24 wherein the collar and the second tube are configured so that the collar rotates with the second tube as the second tube is rotated about its longitudinal axis.

27. The tool of claim 24 wherein the collar includes a generally planar portion and the second tube also includes a generally planar portion which engages the planar portion of the collar.

* * * * *